US006934164B2

(12) United States Patent
Higuchi et al.

(10) Patent No.: US 6,934,164 B2
(45) Date of Patent: Aug. 23, 2005

(54) FUSE BOX

(75) Inventors: Eiji Higuchi, Yokkaichi (JP); Yoshihisa Shimada, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 162 days.

(21) Appl. No.: 10/615,017

(22) Filed: Jul. 9, 2003

(65) Prior Publication Data

US 2004/0008503 A1 Jan. 15, 2004

(30) Foreign Application Priority Data

Jul. 9, 2002 (JP) ....................................... 2002-200494
Jul. 9, 2002 (JP) ....................................... 2002-200543

(51) Int. Cl.[7] ........................... H01H 85/20; H02B 1/18
(52) U.S. Cl. ........................ 361/833; 361/752; 361/797
(58) Field of Search ................................ 361/833, 752, 361/797, 642; 439/621, 763, 522

(56) References Cited

U.S. PATENT DOCUMENTS 5,645,448 A 7/1997 Hill
6,276,960 B1 * 8/2001 Schaefer et al. ............ 439/522

* cited by examiner

*Primary Examiner*—Kamand Cuneo
*Assistant Examiner*—Hung S. Bui
(74) *Attorney, Agent, or Firm*—Oliff & Berridge, PLC

(57) ABSTRACT

A fuse box includes a lower cover and an upper cover mounted on an intermediate case to form a box. A large-capacity fuse having an input terminal and an output terminal projecting in substantially opposite directions from one side surface of a body of the fuse is accommodated sidelong in the box within the lower cover and the upper cover to make a height of the fuse small. This makes the fuse box compact. The fuse box may be directly mounted on a battery by fixedly mounting it to an upwardly projecting batter post. An input-side bus bar to be accommodated in the box and the input terminal are fixed to each other with a screw, with one end of the input-side bus bar overlapping the input terminal. An output-side bus bar to be accommodated in the box and the output terminal are fixed to each other with a screw, with one end of the output-side bus bar overlapping the output terminal. A connection piece rigidly mounts the fuse box to the battery post.

8 Claims, 9 Drawing Sheets

FIG. 8
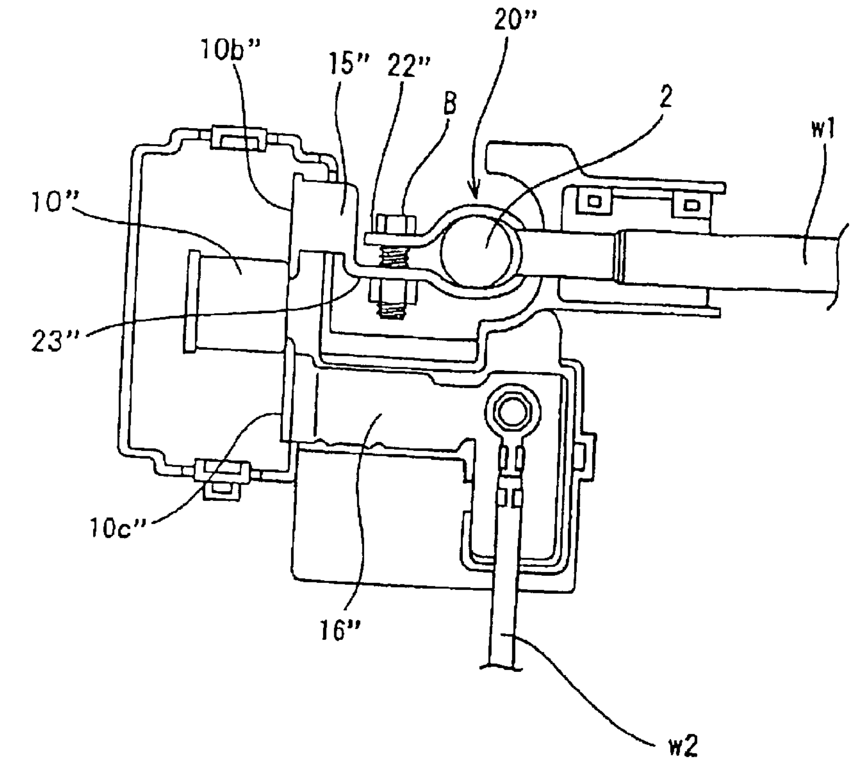
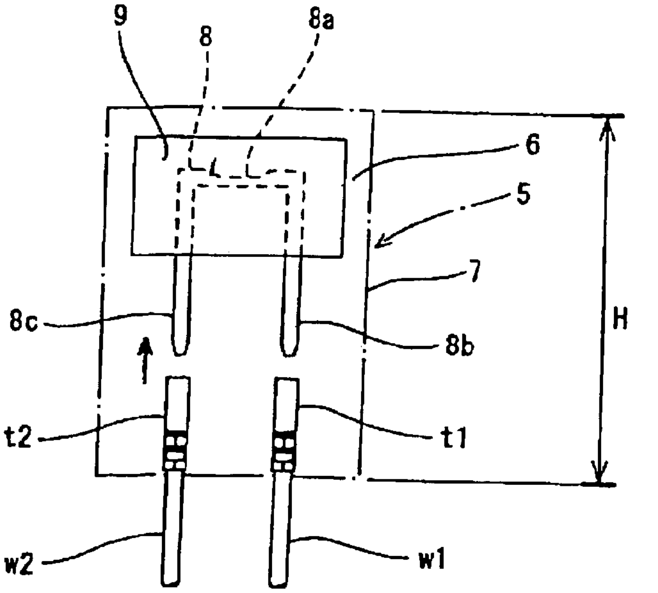
FIG. 9
RELATED ART

FUSE BOX

BACKGROUND OF THE INVENTION

1. Field of Invention

The present invention relates to a fuse box. More particularly, the present invention is intended to make a compact fuse box mounted on a battery.

2. Description of Related Art

Conventionally, as shown in FIG. 10, a fuse box 5 having a fuse 6 is connected to a battery 1 via a lead wire 4 by connecting a battery terminal 3 on the periphery of a battery post 2 located on the upper surface of battery 1. In this arrangement, however, the battery 1 and fuse box 5 are spaced distant from each other, requiring lead wire 4 with two connection positions. Therefore, the increase in parts also increases the time and labor for installation, not to mention, requiring an installing space for fuse box 5. Further, when an external force is applied to the lead wire 4, the lead wire 4 may be damaged.

The above described problem could be solved by mounting the fuse box on the upper surface of the battery box and connecting the battery and battery fuse to each other without using the lead wire. However, since the height of the fuse box is large, it is necessary to provide a large space over the battery box. Thus, if the space has limited height, the fuse box cannot be mounted on the battery box. That is, by installing fuse box 5 on top of battery 1 a new problem arises. In the fuse box 5, as shown in FIG. 9, the battery fuse 6 is housed within box 7, with the longer side of the fuse 6 being vertical and the shorter side being horizontal. Fuse 6 has an input terminal 8*b* and an output terminal 8*c* that project downward from a lower-end surface of a fuse body 9 and couple with terminals t1 and t2 respectively. Terminal t1 connects to the end of the electric wire w1 and terminal t2 connects to the end of the electric wire w2. Due to the orientation of fuse body 9 the height H of the fuse box 5 is large. In the case where fuse 6 is directly connected to a battery, the battery fuse is large because it has a large capacity. Thus, the battery fuse has a large height, which in turn causes the fuse box 5 to have an increased height and a larger installing space is required to accommodate the fuse box 5.

SUMMARY OF THE INVENTION

The present invention has been made in view of the above-described problem. Accordingly, it is an object of the present invention to connect a battery fuse to a battery post without the intermediary element of a lead wire to accomplish the connection. This improves the resistance to shock and the reliability of the electrical connection.

To achieve the object, according to the present invention, there is provided a fuse box for electrically connecting a battery terminal that fits on a battery post to a battery fuse accommodated inside the fuse box that is fixed to an upper surface of a battery.

With this, the battery terminal has a pair of fastening pieces projecting from opposing ends of a circular arc portion fitting on the battery post. A connection piece is formed on an input-side bus bar to fasten to an input terminal of the battery fuse with a bolt and also overlaps a side surface of one of the fastening pieces of the battery terminal. A bolt opening communicating with a bolt opening of each of the fastening pieces is formed on the connection piece to fasten the connection piece and the fastening pieces to each other and also fasten the battery terminal and the battery post to each other with a bolt and a nut.

This allows a one bolt-fastening operation by fixing the battery terminal to the battery post concurrently with the fuse box. Therefore, it is possible to utilize component parts effectively, enhances a resistance to shock of the correction and reduce the number of operation steps.

Another object of the present invention is to provide a fuse box that is small in height to mount onto a battery.

To achieve this object, according to the present invention, there is provided a fuse box in which a lower cover and an upper cover are mounted on a case body (14) to form the fuse box, and a large-capacity fuse having an input terminal and an output terminal project in opposing directions from a side surface of a body of the fuse. The fuse is laid flat in the fuse box to reduce the height of the fuse. An input-side bus bar and an output-side bus bar are housed within the fuse box. Each input and output-side bus bar overlaps the input and output terminals, respectively, and is fixed to the terminals via screws.

As described above, the fuse is laid flat inside the fuse box so that its longer side is horizontal while the shorter side is vertical. This arrangement reduces the overall height of the large-capacity fuse and also allows the fuse to be placed in areas with limited height restrictions.

The input terminal projects horizontally outward from one end of the bottom surface of the body of the fuse and the output terminal project horizontally outward from the other end of the bottom surface of the body of the fuse in a direction orthogonal to both sides of a fusing portion embedded in the body of the fuse. Thereby, the horizontal length of the fuse disposed sidelong can be reduced and the box accommodating the fuse is not long sideways. Therefore, it is possible to make the fuse box compact.

The input-side bus bar and the input terminal projecting outward in one direction, and the output-side bus bar and the output terminal project outward in the opposing direction. The fuse, the input-side bus bar, and the output-side bus bar are accommodated in the fuse box. Thus, the large-capacity fuse can be fixedly and stably accommodated inside the fuse box. The fuse box is preferably used to accommodate a battery fuse.

The fuse box accommodating the battery fuse is mounted on an upper surface of a battery. An input-side of a battery is fastened to the input terminal of the battery fuse and fastened to the battery terminal that connects to a battery post projecting from the upper surface of the battery to electrically connect the battery fuse and the battery to each other.

In the case where the fuse is housed within the fuse box as described above, the input terminal and the input-side bus bar are fixed to each other with a screw by disposing it sideways. The output terminal and the output-side bus bar are fixed to each other with the screw by also disposing it sideways. Thus, when maintenance is required, it is necessary to remove the screw sideways. Hence a very low operability. However, because maintenance is rarely carried out in the case of the battery fuse, there is no inconvenience. On the other hand, the fuse box of the present invention has an advantage that the battery fuse cannot be removed carelessly.

Further, by placing the battery fuse flat inside the fuse box the overall height of the fuse is reduced. Thus, even though the battery has a limitation in its height, it is still possible to mount the fuse box on the upper surface of the battery. Consequently, a limited space in a vehicle body can be utilized effectively.

Since the battery terminal and the battery fuse are connected to each other through the input-side bus bar, it isn't necessary to use a lead wire. However, the lead wire is required in the conventional connection method. Therefore, it is possible to save time and labor in performing a connection operation and improve reliability of the electrical connection with the present invention.

The intermediate case of the fuse box is preferably formed of a nylon-based resin whereas the upper cover and the lower cover are formed of a chemical resistant polypropylene. The upper cover and the lower cover lock with each other. The upper cover has an opening/closing lid via a hinge portion when the battery terminal, the battery post and input-side bus bar are clamped to one another, the opening/closing lid of the upper cover closes to lock the opening/closing lid to the lower cover.

Since the intermediate case is formed of the heat-resistant nylon-based resin, there is no fear that the large-capacity fuse and the bus bar will fuse. Also, since the lower cover and the upper cover are made of chemical-resistant polypropylene battery leaking liquid will not corrode the covers. Further, since polypropylene is less expensive than nylon, the lower cover and the upper cover can be formed at a lower cost.

After the upper cover is locked to the lower cover, the fuse box is placed on the battery and fixed thereto. After the battery terminal is fitted on the periphery of the battery post and the battery fuse are fastened to each other, the opening/closing lid on the upper cover is closed. Therefore, it is possible to mount the fuse box on the battery box with high operability.

A fuse box for electrically connecting a battery terminal and a battery fuse housed within the fuse box can be made with a reduced number of parts in the present invention.

For example, the battery terminal, input and output terminals of the battery fuse, and an input-side bus bar interposed between the input terminal and the battery terminal may be integrally formed from one electrically conductive plate and accommodated inside the fuse box.

In this arrangement, it is possible to facilitate an operation for fixing the battery terminal to the battery post with a bolt without the need for fixing the input-side bus bar and the input terminal to each other with a bolt.

The one electrically conductive plate forming an output terminal of the battery fuse may be extended to form an output-side bus bar integrally with the output terminal, with the output-side bus bar being accommodated in the fuse box.

This construction allows an operation for fixing the output terminal and the output-side bus bar to each other with the bolt omitted and the number of component parts to be reduced.

Also in the present invention, a battery terminal to be fastened to or integrated with a terminal of the battery fuse is accommodated in the fuse box, together with the battery fuse. A circular arc portion of the battery terminal exposed to the outside from the fuse box is fittable on the battery post of a battery and the fastening pieces are tightened with a bolt to fix the fuse box to the battery box.

BRIEF DESCRIPTION OF THE DRAWINGS

The foregoing and other features of the present invention will become apparent with reference to the accompanying drawings wherein:

FIG. 8 is a plan view showing a fuse box accommodating a battery fuse according to a third embodiment of the present invention.

FIG. 9 shows a conventional fuse box.

DETAILED DESCRIPTION OF PREFERRED EMBODIMENTS

Figure 1:
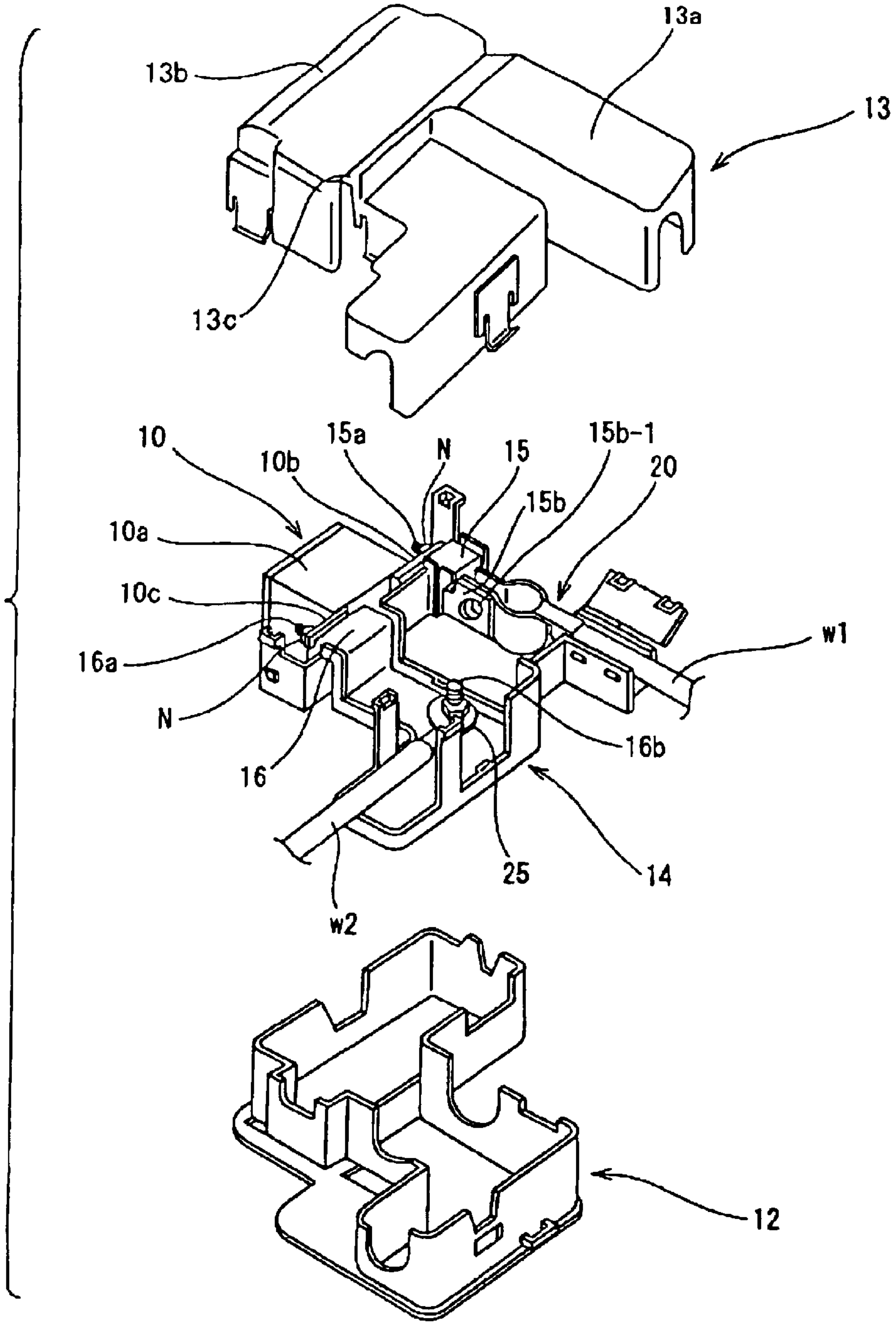
FIG. 1 is an exploded perspective view showing a fuse box according to an embodiment of the present invention.

The embodiments of the present invention will be described below with reference to drawings.

FIGS. 1 through 6 show an embodiment of the present invention in which a fuse box 11 accommodates a battery fuse 10 and is mounted on an upper surface of a battery 1.

The case of the fuse box 11 includes a lower cover 12, an upper cover 13, and an intermediate case 14. Intermediate case 14 accommodates a battery fuse 10, an input-side bus bar 15 and an output-side bus bar 16 both connected to a terminal of the battery fuse 10.

Figure 2:
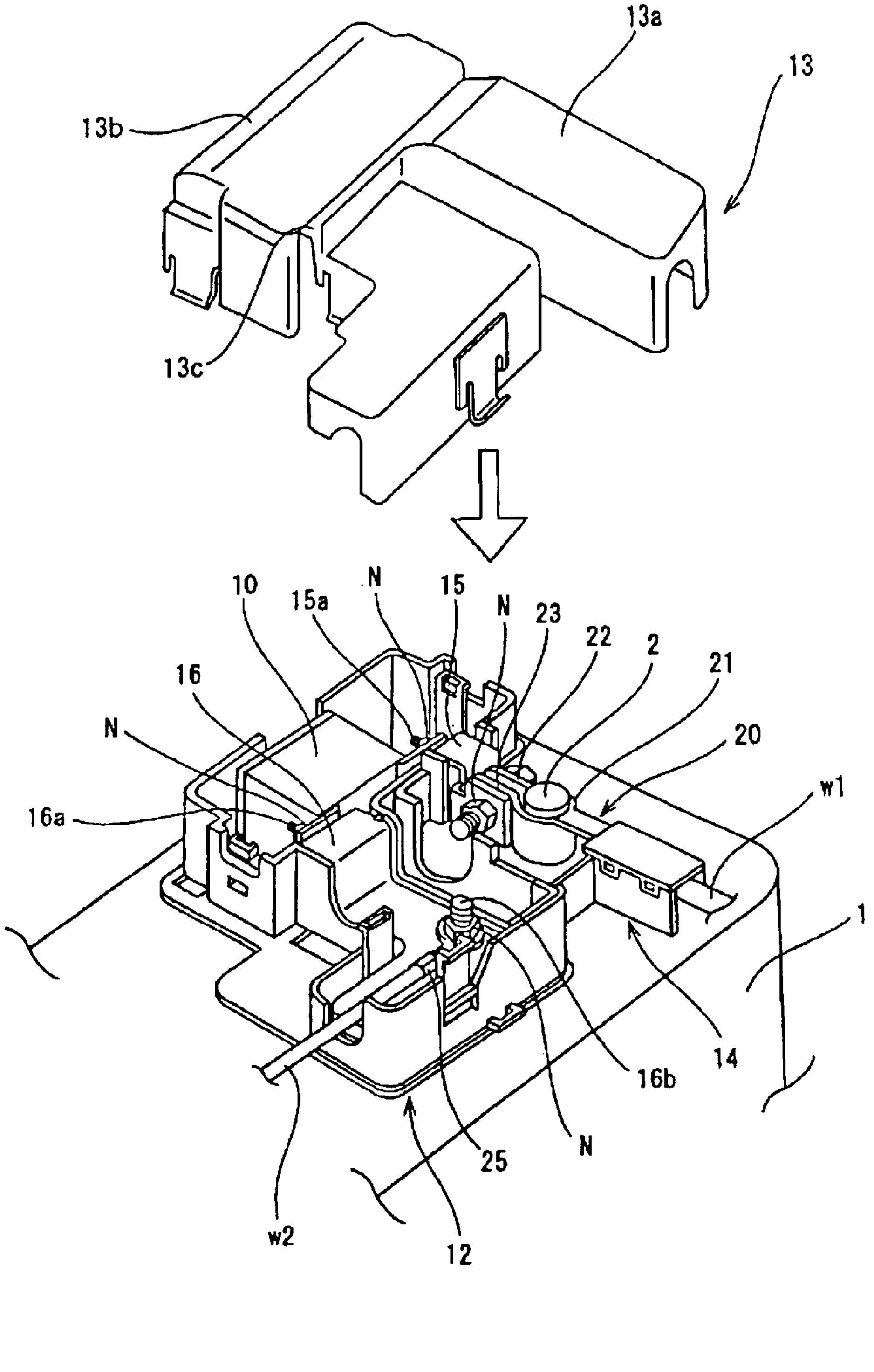
FIG. 2 is a perspective view showing a state in which the fuse box is fixed to a battery box.
Figure 3:
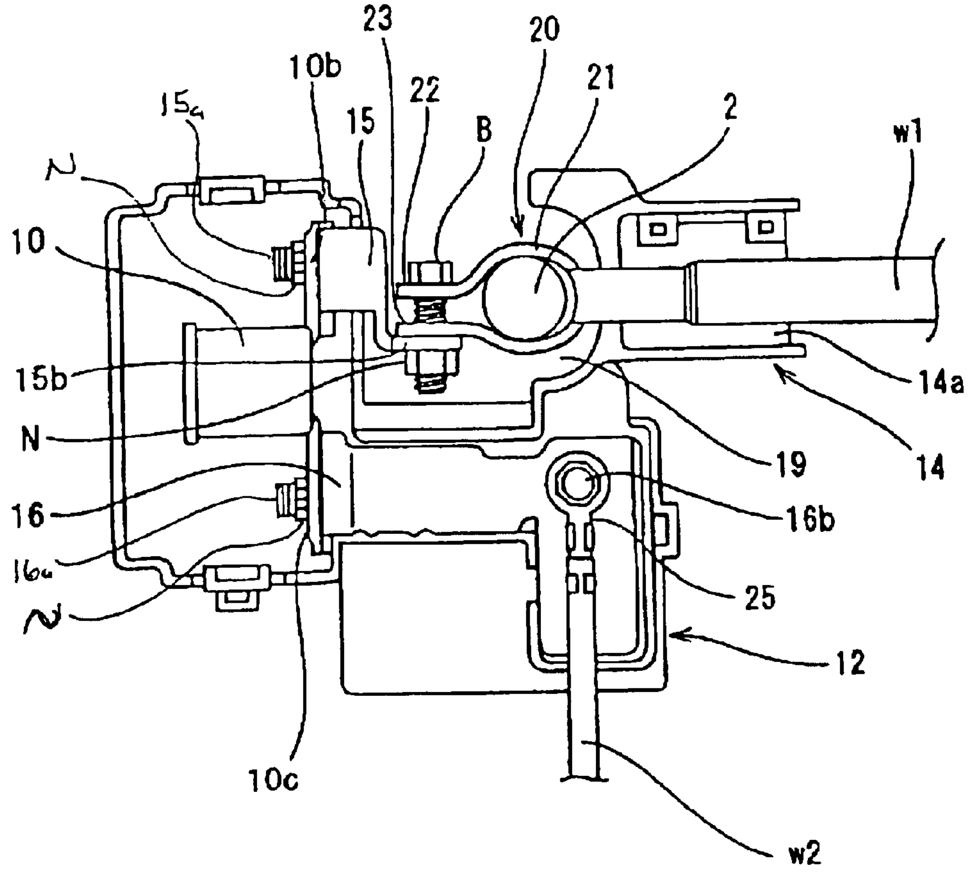
FIG. 3 is a plan view showing the fuse box shown in FIG. 1.

A battery terminal 20 to be fixed to the periphery of a battery post 2 projecting from an upper surface of the battery 1 is fastened to the input-side bus bar 15 to electrically connect the battery fuse 10 to a battery, as can be seen in FIGS. 2 and 3.

Figure 4:
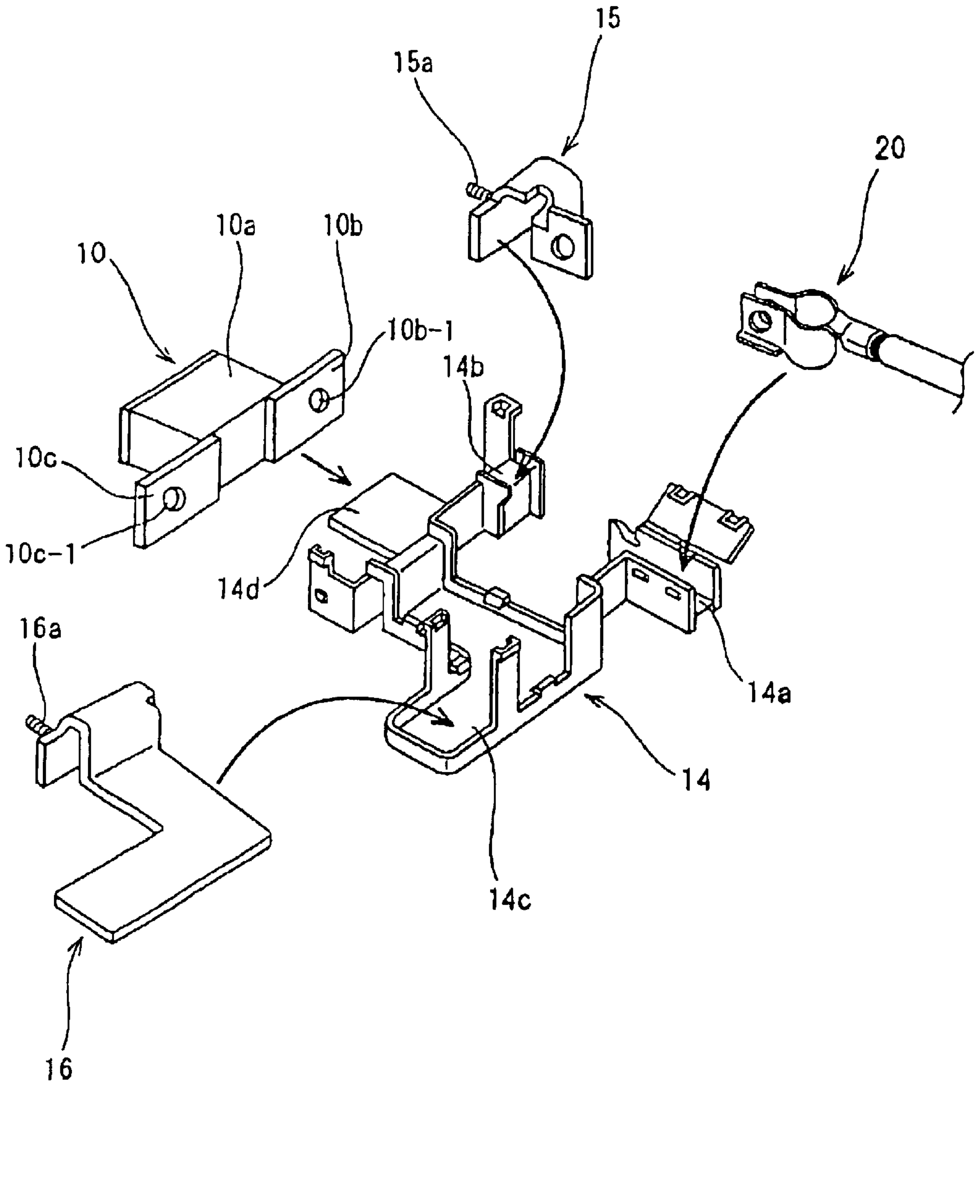
FIG. 4 is an exploded perspective view showing main parts.

More specifically, as shown in FIG. 4, one end of the input-side bus bar 15 is formed to overlap with input terminal 10*b*. Input terminal 10*b* projects horizontally from one end of a bottom surface of body 10*a* of battery fuse 10. The output-side bus bar 16 is formed to overlap with output terminal 10*c*. Output terminal 10*c* projects horizontally from the opposing side of the bottom surface of body 10*a* of battery fuse 10. Screw portions 15*a* and 16*a* project from the input-side bus bar 15 and the output-side bus bar 16 to penetrate through through-holes 10*b*-1 and 10*c*-1 of the input and output terminals 10*b* and 10*c*, respectively, and fixed with a nut N in an X-direction. Thereby, the intermediate case 14 accommodates the battery fuse 10, the input-side bus bar 15, and the output-side bus bar 16.

The intermediate case 14, in which the battery fuse 10, the input-side bus bar 15, and the output-side bus bar 16 are fixedly accommodated, is then mounted on the lower cover 12, and then the upper cover 13 is mounted on to lower cover 12.

Since the intermediate case 14 directly contacts bus bars 15 and 16, both of which having a high calorific value, a heat-resistant resin having a mixture of nylon 66 and PPE (polyphenyl ether) is preferably used for the intermediate case 14. To minimize the amount of resin needed, the resin is used for only a portion of the intermediate case 14 in the area where the battery fuse 10, the input-side bus bar 15, and the output-side bus bar 16 are housed. A resin which is a mixture of polypropylene and talc is used for the lower cover 12. A synthetic resin which is a mixture of polypropylene and an elastic resin is used for the upper cover 13.

In the upper cover 13, one half serves as an opening/closing lid 13*a*. A hinge 13*c* is interposed between the opening/closing lid 13*a* and a second half 13*b* that allows the opening/closing lid 13*a* to lock with the lower cover 12 and also to open and close the opening/closing lid 13*a*.

Figure 6:
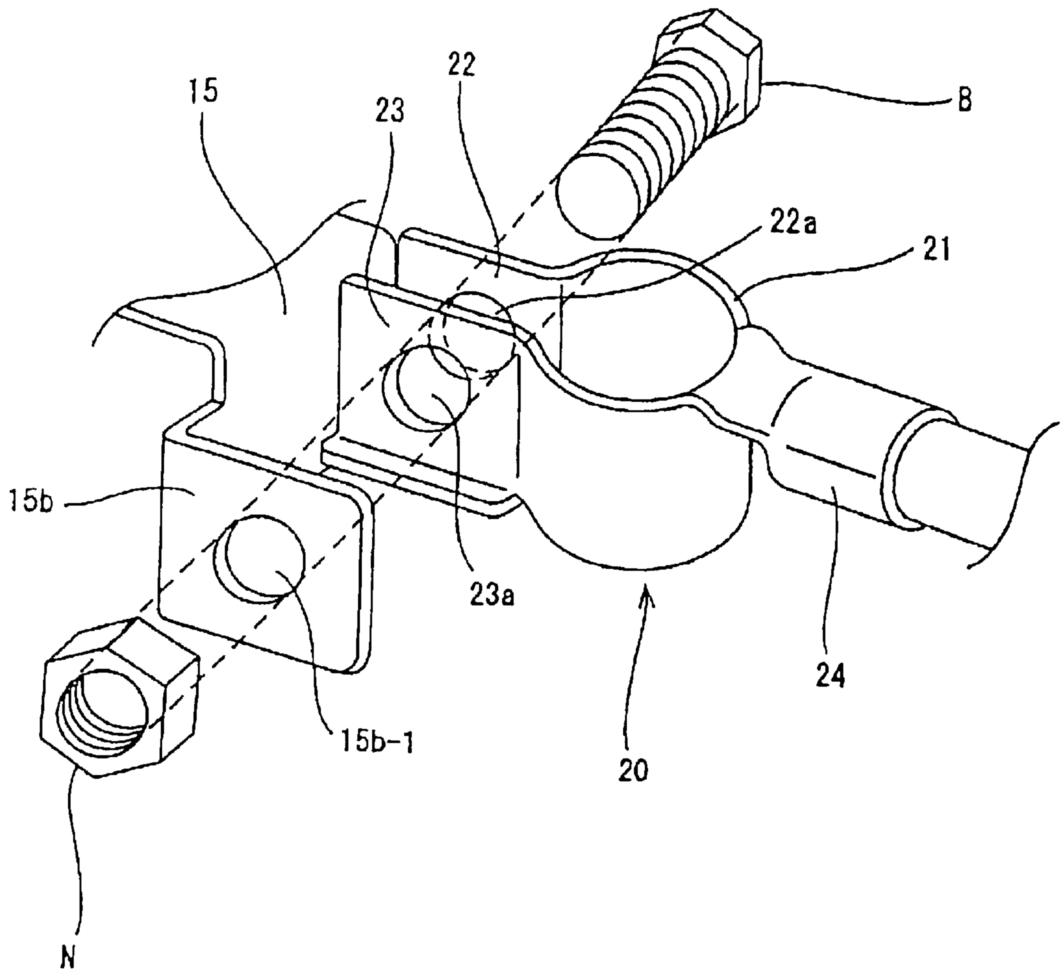
FIG. 6 is an enlarged perspective view showing the battery terminal shown in FIG. 1.

FIGS. 3 and 6 will now be described in more detail. A circular-arc portion 21, of the battery terminal 20, fits on the periphery of the battery post 24 and projects from a barrel portion 24. Barrel portion 24 is crimped to the tip of an electric wire w1 of a power circuit. Electric wire w1 is accommodated in an electric wire accommodation portion 14*a* of the intermediate case 14. An opening 19 is formed on the intermediate case 14 and the lower cover 12 at a position corresponding to the position of the circular-arc portion 21, of the battery terminal 20 and exposing the battery terminal 20 to the outside.

A screw portion 16*b* projects upward from the upper surface of the output-side bus bar 16 at an intermediate position of the other side thereof to fasten a terminal 25 disposed at an end of an electric wire w2 to be connected to a relay box (not shown) to the screw portion 16*b* with the nut N.

A fastening piece 22 projects from the tip of the circular-arc portion 21 at one side, and a fastening piece 23 projects from the tip of the circular-arc portion 21 at an opposing side. Bolt openings 22*a*, 23*a* are formed on the fastening pieces 22 and 23, respectively.

As shown in FIG. 6, input-side bus bar 15 is extended to a position to form a connection piece 15*b* that overlaps with a side of fastening piece 23. Connection piece 15*b* provides a bolt opening 15*b*-1 through which a bolt communicates with bolt opening 22*a*, 23*a* of fastening pieces 22 and 23 to couple battery 1, battery terminal 20 and fuse box 11 to each other.

The method of fixing the fuse box 11 to the battery box 1 is described below. Initially, the circular arc portion 21 of the battery terminal 20 is fitted on the periphery of the battery post 2. With the bolt openings (22*a*, 23*a* and 15*b*-1) of fastening pieces 22, 23 and connection piece 15*b* overlapping each other, a bolt B is inserted through the bolt openings and clamped with a nut N. Thereby, the circular arc portion 21 fits on the periphery of the battery post 2, the battery and the battery fuse 10 are electrically connected to each other, and the fuse box 11 is fixed to the battery 1. Then the opening/closing lid 13*a* of the upper cover 13 is closed to lock the upper cover 13 to the lower cover 12.

In the above-described construction, since the battery fuse 10 is housed within fuse box 11 with its longer side horizontal and its shorter side vertical, the height of the fuse box 11 can be smaller. Thus, it is possible to dispose the battery fuse in an area with a restricted height limitation. More specifically, it is possible to secure a clearance between the fuse box 11 disposed on the upper surface of the battery box 1 and a bonnet (not shown).

Figure 5A:
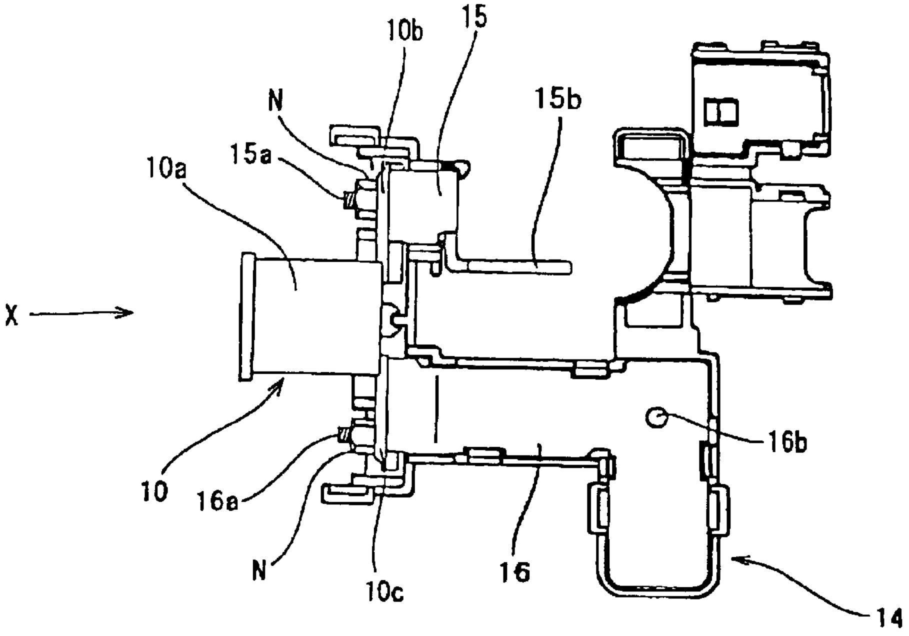
FIG. 5A is a plan view showing a state in which a battery fuse is fixed to a case body.
Figure 5B:
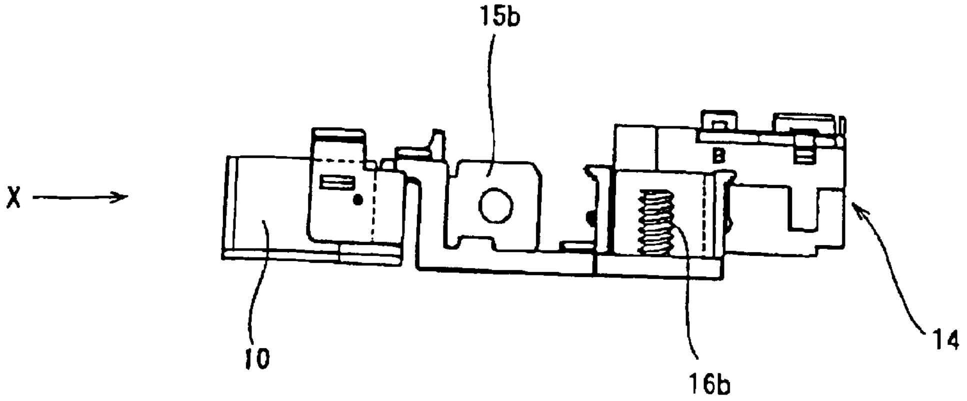
FIG. 5B is a front view showing the state in which the battery fuse is fixed to the case body.

The battery fuse 10 is oriented inside the fuse box 11 in such a manner that the battery fuse 10 is fixed to the intermediate case 14 with a screw disposed in the X-direction shown in FIGS. 5A and 5B. Although a screwing operation can be performed easily, the screw cannot be removed easily after the fuse box 11 is formed. However, because maintenance is rarely carried out on battery fuse 10, there is no harm in fixing the battery fuse 10 to the case body 14 with the screw disposed in the X-direction. On the contrary, the battery fuse 10 cannot be removed carelessly.

Since the fuse box 11 is directly installed on the battery box 1, it is unnecessary to provide a space for the fuse box like in the conventional fuse box. Thus, a limited space in a vehicle can be effectively utilized. The battery terminal 20, battery 1, and the battery fuse 10 are directly electrically connected to each other without the need of a lead wire as in the conventional method. Thus, it is possible to improve reliability of the electric connection with the direct connection and possible to reduce the number of component parts. This saves time and labor in assembly and reduces cost.

Figure 7:
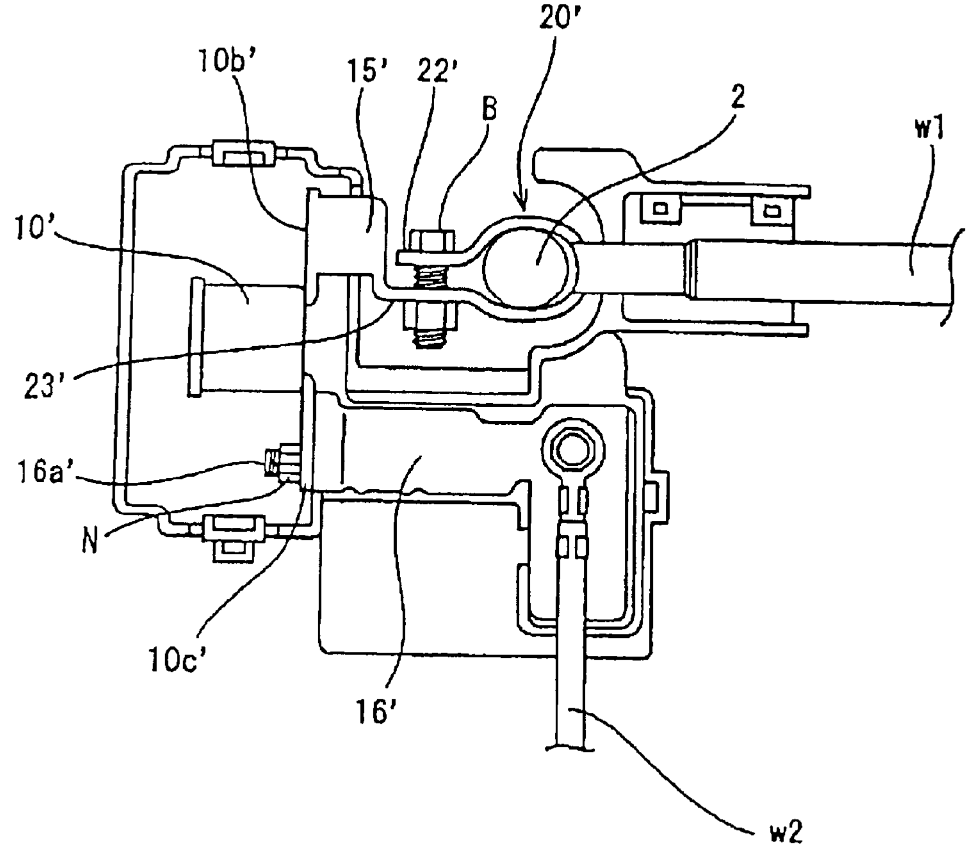
FIG. 7 is a plan view showing a fuse box accommodating a battery fuse according to a second embodiment of the present invention.
Figure 10:
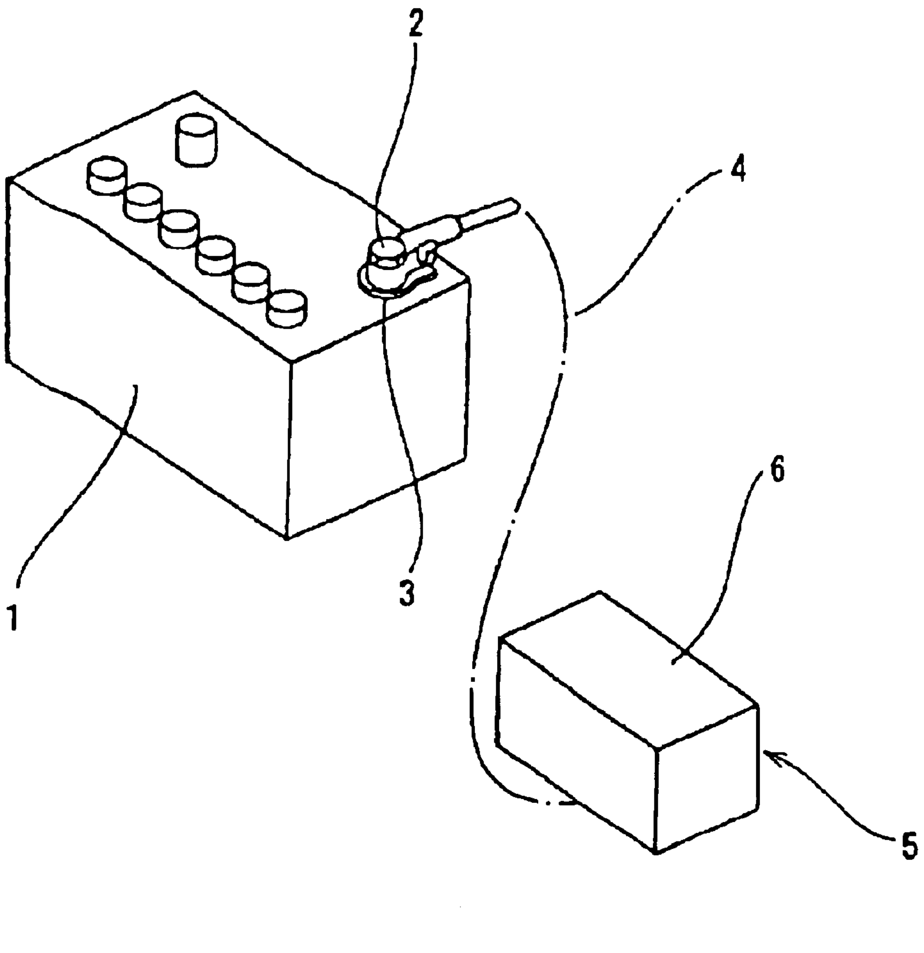
FIG. 10 RELATED ART
FIG. 10 shows a conventional method of connecting a battery and a fuse to each other.

FIG. 7 shows a second embodiment in which an output terminal 10*c*' of a battery fuse 10', an input terminal 10*b*' thereof, an input-side bus bar 15', and a battery terminal 20' are formed by punching one electrically conductive metal plate.

More specifically, the input terminal 10*b*' is extended to form the input-side bus bar 15', and the input-side bus bar 15' is formed continuously with an end of a fastening piece 23' of the battery terminal 20'.

The output-side bus bar 16' is formed separately from the output terminal 10*c*'. With one end of the output terminal 10*c*' and one end of the output-side bus bar 16' overlapping each other, a screw portion 16*a*' projecting from the output-side bus bar 16' is penetrated through a through-hole (not shown) of the output terminal 10*c*' and clamped with a nut N.

In the second embodiment, a circular arc portion 21' of a battery terminal 20' is fitted on a battery post 2. A pair of the fastening pieces 22, 23 are fastened with bolt B and nut N to fix the fastening pieces 22, 23 to the battery post 2. Thereby, the battery post 2 and the input terminal 10*b*' of the battery fuse 10' can be connected to each other. Further since the battery terminal, the input-side bus bar, the input terminal, and the output terminal are formed integrally, it is possible to reduce the number of operation steps and the number of component parts. Because the other constructions of the second embodiment are similar to those of the first embodiment, description thereof is omitted herein.

FIG. 8 shows a third embodiment in which an output-side bus bar 16", an output terminal 10*c*" of a battery fuse 10", an input terminal 10*b*", an input-side bus bar 15", and a battery terminal 20" are formed by punching one electrically conductive metal plate.

More specifically, the input terminal 10*b*" is extended to form the input-side bus bar 15", the input-side bus bar 15" is formed continuously with an end of a fastening piece 23" of the battery terminal 20", and the output terminal 10*c*" is extended to form the output-side bus bar 16" integrally with the output terminal 10*c*".

In the third embodiment, since the output-side bus bar 16", the output terminal 10*c*", the input terminal 10*b*", the input-side bus bar 15", and the battery terminal 20" are formed integrally, it is possible to reduce the number of operation steps and the number of component parts. Because the other constructions of the third embodiment are similar to those of the first embodiment, description thereof is omitted herein.

What is claimed is:

1. A fuse box, comprising:

an intermediate case;

a lower case mounted on the intermediate case;

an upper case mounted on the intermediate case;

a large capacity fuse having an input terminal and an output terminal, the fuse also having long and short sides housed within the fuse box with the short sides being approximately perpendicular to the upper case and the lower case to reduce the overall height of the fuse box;

an input-side bus bar abutting and connected to the input terminal; and an output-side bus bar abutting and connected to the output terminal.

2. The fuse box according to claim 1, wherein the fuse box is mountable on an upper surface of a battery having a battery post, the fuse box further comprising a battery terminal fittable on the battery post and connected to the input terminal through the input-side bus bar.

3. The fuse box according to claim 2, wherein the input terminal rigidly connects with the battery terminal and the battery post of the battery so as to fix the fuse box to the battery and also form an electrical connection.

4. The fuse box according to claim 1, wherein the input terminal and the output terminal project from a side surface of the fuse in substantially opposite directions substantially parallel with the upper case.

5. The fuse box according to claim 1, wherein the upper and lower case lock with one another; the upper case has a first and second half that are divided by a hinge, the first half forming a lid that releasably attaches to the lower case.

6. The fuse box according to claim 1, wherein the intermediate case is formed from a nylon-based resin and the upper case and the lower case are formed from polypropylene.

7. A battery fuse according to claim 1, wherein the battery terminal is accommodated in the fuse box and a circular arc portion of the battery terminal is exposed to the outside of the fuse box and fittable onto the battery post, the circular arc portion and the fastening pieces being tightenable by the bolt and nut to fix the fuse box onto the battery.

8. A battery fuse according to claim 1, wherein the battery fuse, the input side bus bar and the output side bus bar are fixedly accommodated on the intermediate case.

* * * * *